United States Patent

Irie

(10) Patent No.: US 9,640,134 B2
(45) Date of Patent: May 2, 2017

(54) DISPLAY DEVICE FOR CONTROLLING DISPLAY OF INFORMATION FROM FIRST TERMINAL DEVICE BASED ON COMPARISON OF RECEIVED PATH INFORMATION FROM FIRST TERMINAL DEVICE AND PREREGISTERED PATH INFORMATION FROM SECOND TERMINAL DEVICE, DISPLAY METHOD AND COMPUTER READABLE STORAGE DEVICE

(71) Applicant: CASIO COMPUTER CO., LTD., Tokyo (JP)

(72) Inventor: Tamotsu Irie, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 18 days.

(21) Appl. No.: 14/663,532

(22) Filed: Mar. 20, 2015

(65) Prior Publication Data

US 2015/0269704 A1    Sep. 24, 2015

(30) Foreign Application Priority Data

Mar. 20, 2014    (JP) ................................. 2014-057841

(51) Int. Cl.
*G09G 5/00*    (2006.01)
*G06F 3/14*    (2006.01)

(52) U.S. Cl.
CPC ............... *G09G 5/003* (2013.01); *G06F 3/14* (2013.01); *G09G 2370/022* (2013.01); *G09G 2370/10* (2013.01)

(58) Field of Classification Search
None
See application file for complete search history.

(56) References Cited

U.S. PATENT DOCUMENTS

2011/0032870 A1*  2/2011  Kumar .................. H04W 12/12
                                                                  370/328

FOREIGN PATENT DOCUMENTS

JP          2002-049556  A    2/2002
JP          2002049556      *  2/2002

* cited by examiner

*Primary Examiner* — Vu Nguyen
(74) *Attorney, Agent, or Firm* — Scully, Scott, Murphy & Presser, P.C.

(57) ABSTRACT

A display device includes: a storage unit, a communication unit and a control unit. In the storage unit, preregistered path information indicating a network path is stored. The communication unit receives path information indicating a network path sent from a terminal device. The control unit (i) compares the received path information with the stored path information so as to determine whether or not the received path information and the stored path information indicate approximately the same path and (ii) displays display information on a display unit when determining that the received path information and the stored path information indicate approximately the same path.

16 Claims, 4 Drawing Sheets

DISPLAY DEVICE FOR CONTROLLING DISPLAY OF INFORMATION FROM FIRST TERMINAL DEVICE BASED ON COMPARISON OF RECEIVED PATH INFORMATION FROM FIRST TERMINAL DEVICE AND PREREGISTERED PATH INFORMATION FROM SECOND TERMINAL DEVICE, DISPLAY METHOD AND COMPUTER READABLE STORAGE DEVICE

CROSS-REFERENCE TO RELATED APPLICATIONS

This application is based upon and claims the benefit of priority under 35 USC 119 of Japanese Patent Application No. 2014-057841 filed on Mar. 20, 2014, the entire disclosure of which, including the specification, claims, drawings and abstract, is incorporated herein by reference in its entirety.

BACKGROUND OF THE INVENTION

1. Field of the Invention

The present invention relates to a display device, a display method and a computer readable medium.

2. Description of the Related Art

There has been known a system to send image signals from an information processing device via a network to a display device connected to the network so as to display images at a remote place. (Refer to, for example, Japanese Patent Application Laid-Open Publication No. 2002-049556).

While the system to display images by remote control on a display device connected to a network is convenient for a plurality of users to share the display device, there is a need to put restriction on users who can use the display device. The restriction may be put by credentials such as an ID (identification) and a password. However, this allows any user to use the display device no matter where the user is as long as the user has obtained the credentials, and therefore a user at an inappropriate location cannot be excluded from the users who can use the display device.

An object of the present invention is, in the case of displaying images by remote control on a display device connected to a network, to prevent a user at an inappropriate location from displaying images on the display device.

SUMMARY OF THE INVENTION

According to an aspect of the present invention, there is provided a display device including: a storage unit in which preregistered path information indicating a network path is stored; a communication unit which receives path information indicating a network path sent from a terminal device; and a control unit which (i) compares the received path information with the stored path information so as to determine whether or not the received path information and the stored path information indicate approximately the same path and (ii) displays display information on a display unit when determining that the received path information and the stored path information indicate approximately the same path.

BRIEF DESCRIPTION OF THE DRAWING

The present invention is fully understood from the detailed description given hereinafter and the accompanying drawings, which are given by way of illustration only and thus are not intended to limit the present invention, wherein.

DETAILED DESCRIPTION OF THE PREFERRED EMBODIMENT

Hereinafter, embodiments of the present invention are detailed with reference to the drawings. Although various limitations technically preferable for carrying out the present invention are given to the embodiments below, the scope of the present invention is not limited to the embodiments or illustrated examples.

[Configuration]

Figure 1:
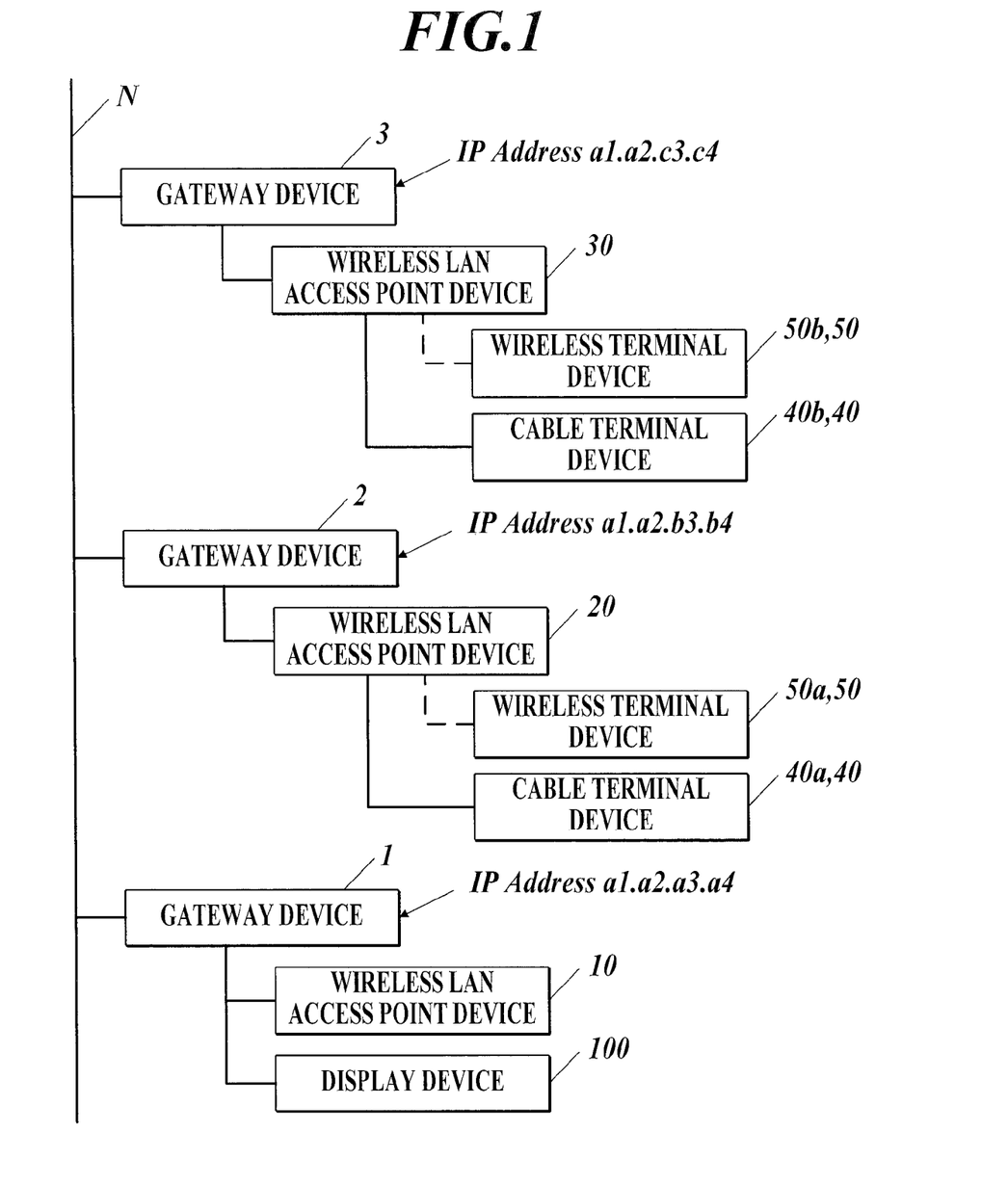
FIG. 1 shows the configuration of a network including a display system of the present invention.

FIG. 1 shows the configuration of a network including a display system according an embodiment of the present invention.

As shown in FIG. 1, a gateway device 1, a gateway device 2 and a gateway device 3 are connected to each other via a network N.

The IP address of the gateway device 1 is "a1.a2.a3.a4".
The IP address of the gateway device 2 is "a1.a2.b3.b4".
The IP address of the gateway device 3 is "a1.a2.c3.c4".

To the gateway device 1, a wireless LAN (Local Area Network) access point device 10 ("access point 10" hereinafter) and a display device 100 which displays images are connected.

To the gateway device 2, a wireless LAN access point device 20 ("access point 20" hereinafter) is connected.

In the same area as the access point 20, one or a plurality of cable terminal devices 40 (a cable terminal device 40a in the embodiment) and one or a plurality of wireless terminal devices 50 (a wireless terminal device 50a in the embodiment) are present.

To the gateway device 3, a wireless LAN access point device 30 ("access point 30" hereinafter) is connected.

In the same area as the access point 30, one or a plurality of cable terminal devices 40 (a cable terminal device 40b in the embodiment) and one or a plurality of wireless terminal devices 50 (a wireless terminal device 50b in the embodiment) are present.

The network N is a network to connect the gateway device 1, the gateway device 2 and the gateway device 3 to each other; for example, a LAN defined by IEEE802.11 standard.

A display system 1000 of the embodiment of the present invention includes the display device 100, the cable terminal devices 40 and the wireless terminal devices 50.

Figure 2:
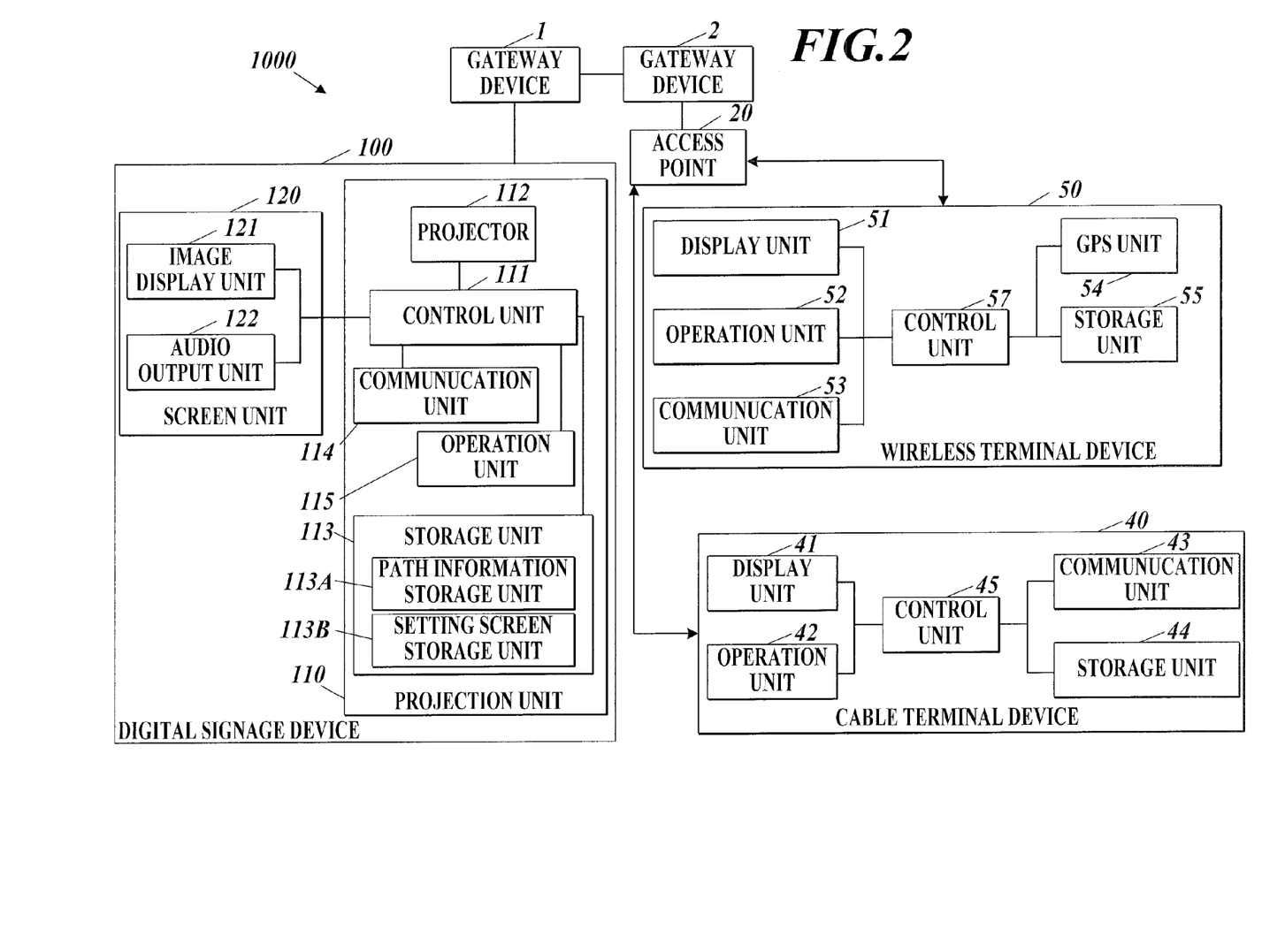
FIG. 2 is a block diagram showing the main control configurations of display devices, cable terminal devices and wireless terminal devices which constitute the display system of the present invention.

FIG. 2 is a block diagram showing the main control configurations of the display device 100, the cable terminal devices 40 and the wireless terminal devices 50 which constitute the display system 1000.

In the embodiment, a digital signage device is used as the display device 100. Other examples of the display device 100 include: a projector which displays images by projecting the images to a screen or a wall; and flat displays such as a liquid crystal display and a plasma display.

Each of the cable terminal devices 40 is, for example, an information processing device, and examples thereof include a PC (Personal Computer). The cable terminal devices 40*a* and 40*b* of the embodiment are the same in the basic configuration.

Each of the wireless terminal devices 50 is, for example, a portable device, and examples thereof include a mobile phone, a smartphone and a tablet terminal. The wireless terminal devices 50*a* and 50*b* of the embodiment are the same in the basic configuration.

These devices perform data communication under a communication environment with, for example, http (Hypertext Transfer Protocol) or https (Hypertext Transfer Protocol Secure). As a communication system, https, which encodes http communication with SSL or TLS, is preferred.

First, the configuration of the display device 100 is described.

The display device 100 includes: a projection unit 110 which emits image light of images; and a screen unit 120 which receives on the back the image light emitted from the projection unit 110 and projects the image light to the front.

The projection unit 110 include: a control unit 111 which controls the units of the display device 100 on the basis of content data composed of images and/or audios; a projector 112 which is connected to the control unit 111, and converts image data output from the control unit 111 into image light and emits the image light to the screen unit 120; a storage unit 113 which stores therein various programs and various content data; a communication unit 114 which communicates with the gateway devices 1 to 3; and an operation unit 115 which receives user operations.

The screen unit 120 includes: an image display unit 121 constituted of a translucent plate or the like disposed approximately at right angles with an emission direction of image light; and an audio output unit 122 constituted of a speaker or the like. The audio output unit 122 is connected to the control unit 111 by a cable or the like so as to transmit audio signals thereto.

The control unit 111 includes: a not-shown CPU (Central Processing Unit) which performs predetermined arithmetic operations and controls the units of the display device 100 by executing various programs; and a not-shown memory which serves as a work area at the time of the execution of the programs.

The control unit 111 stores in the storage unit 113 path information sent from a predetermined cable terminal device 40 when a path information registration process to register the path information is performed in response to user operations.

Further, the control unit 111 performs an image acceptance/non-acceptance determination process to determine whether or not to accept (receive) display information (image signals) sent from a wireless terminal device 50. When receiving path information which is sent from the wireless terminal device 50 prior to the display information, the control unit 111 compares the received path information with the path information stored in the storage unit 113 so as to determine whether or not these two pieces of the path information indicate approximately (substantially) the same path.

When determining that the two pieces of the path information indicate approximately the same path, the control unit 111 receives the display information and makes the screen unit 120 output images and/or audios.

The storage unit 113 includes a path information storage unit 113A and a setting screen storage unit 113B.

In the path information storage unit 113A, the path information obtained by the display device 100 through the path information registration process performed in response to user operations is registered and stored.

In the setting screen storage unit 113B, a setting screen which is sent to the cable terminal device 40 to register path information is stored.

In the storage unit 113, a WEB (World Wide Web) server program for operating the setting screen on a WEB screen and the like are also stored.

The operation unit 115 is constituted of, for example, a remote controller communicable with the control unit 111 by infrared rays or operation keys disposed on the projection unit 110.

Next, the configuration of the cable terminal device 40 is described.

The cable terminal device 40 includes a display unit 41, an operation unit 42, a communication unit 43, a storage unit 44 and a control unit 45 which controls these units.

The display unit 41 is constituted of, for example, a liquid crystal panel or an organic EL (Electro Luminescence) panel.

The operation unit 42 is constituted of, for example, a keyboard and a mouse.

The communication unit 43 communicates with a gateway device (the gateway device 2 or 3 in the embodiment).

The storage unit 44 is constituted of, for example, a storage medium such as an HHD (Hard Disk Drive) and stores therein a system program for operating the cable terminal device 40, various control programs and various data.

When the path information registration process to register path information in the display device 100 is performed in response to user operations, the control unit 45 connects the cable terminal device 40 to a gateway device (the gateway device 2 or 3 in the embodiment) near the cable terminal device 40 in response to a user operation and requests the display device 100 to send the setting screen stored in the storage unit 113 of the display device 100.

Next, the configuration of the wireless terminal device 50 is described.

The wireless terminal device 50 includes a display unit 51, an operation unit 52, a communication unit 53, a GPS (Global Positioning System) unit 54, a storage unit 55 and a control unit 57 which controls these units.

The display unit 51 is constituted of, for example, a liquid crystal panel or an organic EL (Electro Luminescence) panel.

The operation unit 52 is constituted of, for example, a touch panel or operation keys.

The communication unit 53 communicates with an access point (the access point 20 or 30 in the embodiment) in accordance with, for example, Wi-Fi (Wireless Fidelity), 3G, ($3^{rd}$ Generation) or LTE (Long Term Evolution) standard.

The GPS unit 54 receives radio signals from a GPS satellite and calculates a position, a moving direction and a speed on the basis of the radio signals, thereby measuring the position of the wireless terminal device 50.

In the storage unit 55, an application to communicate with the display device 100 is stored. Examples of the application to communicate with the display device 100 include an image sending application.

The control unit 57 starts the image sending application so as to send the display information to the display device 100.

[Path Information Registration Process]

Figure 3:
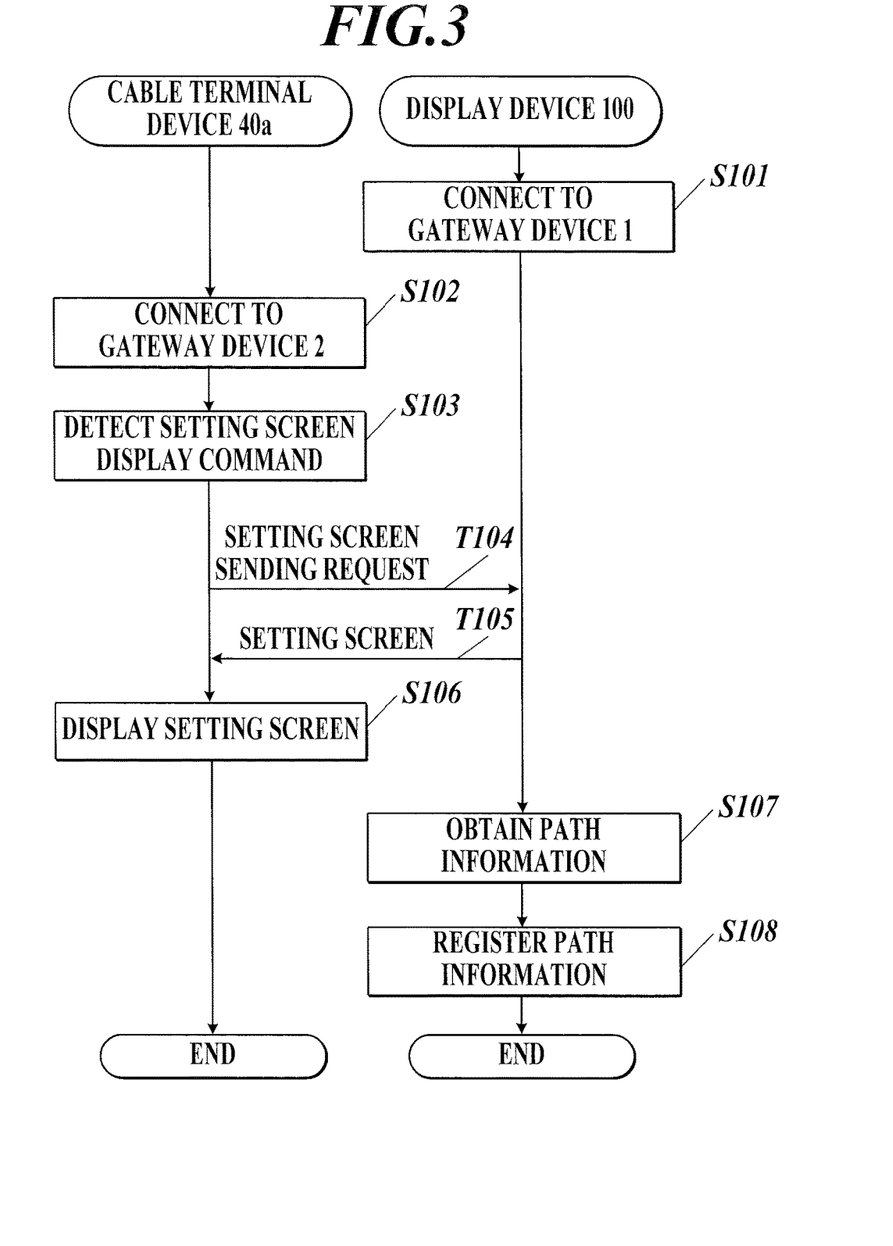
FIG. 3 is a flowchart of a path information registration process.

FIG. 3 is a flowchart of a path information registration process to register path information of the cable terminal device 40 in the display device 100.

In the embodiment, the cable terminal device 40*a* is used to register path information.

This path information registration process is performed in response to operations by a network administrator who operates the network N.

First, the control unit 111 of the display device 100 connects the display device 100 to the gateway device 1 in response to a network administrator ("user" hereinafter) operation (S101).

Next, the control unit 45 of the cable terminal device 40*a* connects the cable terminal device 40*a* to the gateway device 2 in response to a user operation (S102).

Next, when the user accesses a predetermined URL (Uniform Resource Locator), thereby performing an operation to display the setting screen, which is used for registration of path information in the display device 100, the control unit 45 of the cable terminal device 40*a* detects a display command to display the setting screen ("setting screen display command" hereinafter) (S103) and sends a setting screen sending request to the display device 100 (T104). The setting screen sending request contains, for example, IP packet data.

In order that the cable terminal device 40*a* accesses the setting screen of the display device 100, an account name and a password of the network administrator are needed.

When receiving the setting screen sending request from the cable terminal device 40*a*, the control unit 111 of the display device 100 reads the setting screen stored in the setting screen storage unit 113B and sends the setting screen to the cable terminal device 40*a* (T105).

When receiving the setting screen from the display device 100, the control unit 45 of the cable terminal device 40*a* displays the setting screen on the display unit 41 (S106). On the setting screen, predetermined buttons or the like are displayed so that the user can perform a predetermined operation.

The control unit 111 of the display device 100 also reads and obtains path information ("a1.a2.b3.b4" and "a1.a2.a3.a4") indicating a network path which is from the cable terminal device 40*a*, through the gateway device 2, to the gateway device 1 described in the IP packet data received at Step T104 (S107) and stores the obtained path information in the path information storage unit 113A (S108).

Thus, the path information on the network N from the cable terminal device 40*a*, through the gateway device 2, to the gateway device 1 is registered in the display device 100.

Note that the access to the setting screen, which is necessary for the path information registration process, is a right given to the network administrator only, and the credentials cannot be changed by any general user.

[Image Acceptance/Non-Acceptance Determination Process]

Figure 4:
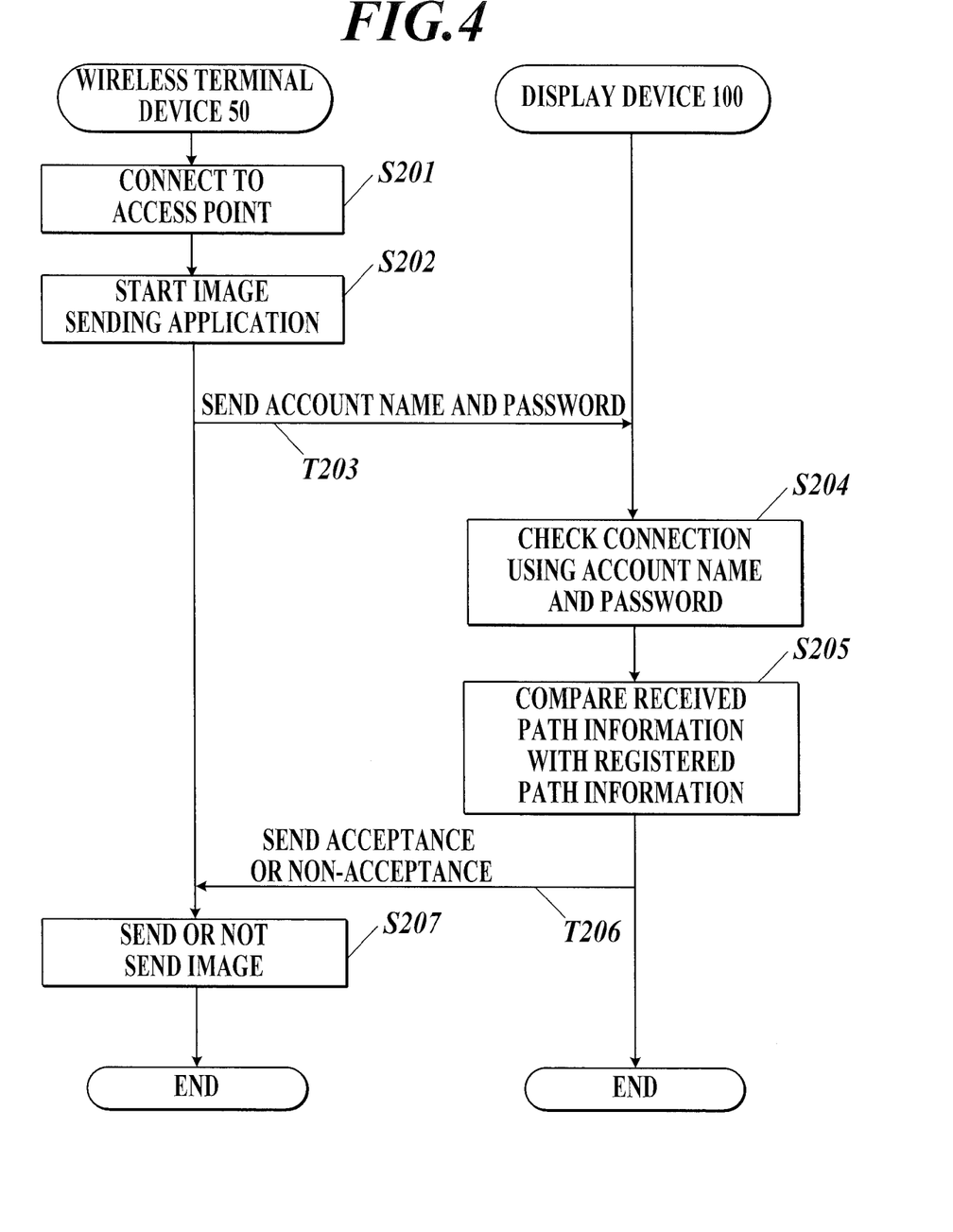
FIG. 4 is a flowchart of an image acceptance/non-acceptance determination process.

FIG. 4 is a flowchart of an image acceptance/non-acceptance determination process to determine whether or not the display device 100 accepts images from the wireless terminal device 50 so as to display the images.

This image acceptance/non-acceptance determination process is performed in response to operations by a general user who would like to make use of the display device 100.

As a precondition for the image acceptance/non-acceptance determination process, the above-described path information registration process is performed in response to operations by the network administrator, and the path information ("a1.a2.b3.b4" and "a1.a2.a3.a4") is registered in the display device 100.

First, the control unit 56 of the wireless terminal device 50 connects the wireless terminal device 50 to an access point (the access point 20 or 30 in the embodiment) in response to a user operation (S201).

Next, the control unit 56 of the wireless terminal device 50 starts the image sending application in response to a user operation (S202) and sends IP packet data containing an account name and a password to the display device 100 (T203).

When receiving the account name and the password from the wireless terminal device 50, the control unit 111 of the display device 100 checks connection with the wireless terminal device 50 using the account name and the password (S204). Note that if the account name and/or the password are incorrect, the control unit 111 of the display device 100 sends error information to the wireless terminal device 50.

Next, the control unit 111 of the display device 100 refers to path information indicating a network path contained in the received IP packet data, and compares the path information with the path information preregistered (stored) in the path information storage unit 113A so as to determine whether or not these two pieces of the path information indicate approximately the same path by finding whether or not the two pieces of the path information match or are similar to each other (S205).

More specifically, when the received path information is the one ("a1.a2.b3.b4" and "a1.a2.a3.a4") sent from the wireless terminal device 50*a*, the path information indicates the same path as the path through which data is sent from the cable terminal device 40*a*, so that the two pieces of the path information match, and therefore it is determined that the two pieces of the path information indicate approximately the same path.

If the two pieces of the path information indicate different wireless LAN access points but indicate the same gateway device as a way point, the two pieces of the path information are similar to each other, and therefore it may be determined that the two pieces of the path information indicate approximately the same path.

On the other hand, when the received path information is the one ("a1.a2.c3.c4" and "a1.a2.a3.a4") sent from the wireless terminal device 50*b*, the path information indicates the path different from the path through which data is sent from the cable terminal device 40*a*, so that the two pieces of the path information do not match, and therefore it is determined that the two pieces of the path information do not indicate approximately the same path.

The control unit 111 of the display device 100 sends acceptance to the wireless terminal device 50 when determining that the two pieces of the path information indicate approximately the same path, and sends non-acceptance to the wireless terminal device 50 when determining that the two pieces of the path information do not indicate approximately the same path (T206).

The control unit 56 of the wireless terminal device 50 starts sending images to the display device 100 when receiving the acceptance from the display device 100, and does not send images to the display device 100 when receiving the non-acceptance from the display device 100 (S207).

The control unit 56 of the wireless terminal device 50 transmits image signals to the display device 100, thereby sending images to the display device 100, and in response to this, the control unit 111 of the display device 100 outputs images and/or audios with the image display unit 121 and/or the audio output unit 122.

On the other hand, the control unit 56 of the wireless terminal device 50 displays an error message on the display unit 51 when not sending images to the display device 100.

In the above process, when the wireless terminal device 50a, the cable terminal device 40a used for the path information registration process earlier or another cable terminal device in the same area as the wireless terminal device 50a and the cable terminal device 40a connects itself to the display device 100, the path information sent therefrom indicates a network path which is to the display device 100 via the gateway device 2 and the gateway device 1. Therefore, it is determined that the path is approximately the same as the path from the cable terminal device 40a toward the display device 100, the cable terminal device 40a having registered path information before, so that it is determined that images are acceptable therefrom.

On the other hand, when the wireless terminal device 50b connects itself to the display device 100, it is not determined that the path is approximately the same as the path from the cable terminal device 40a toward the display device 100, the cable terminal device 40a having registered path information before, so that it is determined that images are not acceptable therefrom.

In order that the wireless terminal device 50b obtains the acceptance, it is necessary to perform in advance the path information registration process with a terminal device (the cable terminal device 40b or the wireless terminal device 50b in the embodiment) around an access point to use (the access point 30 in the embodiment) by (i) reading path information from IP packet data for communicating with the display device 100 via the gateway device 3, the display device 100 being connected to the gateway device 1, and (ii) registering the read path information in the display device 100.

The access to the setting screen necessary for the path information registration process is a right given to the network administrator only, and the credentials cannot be changed by any general user. Therefore, the access to the display device 100 for sending images thereto from a different area can be restricted in the network administrator's lap.

As described above, according to the embodiment, the control unit 111 of the display device 100 stores preregistered path information indicating a network path in the storage unit 113, receives with the communication unit 114 path information indicating a network path sent from the wireless terminal device 50, compares the received path information with the stored path information so as to determine whether or not the received path information and the stored path information indicate approximately the same path, and displays display information on the screen unit 120 when determining that the received path information and the stored path information indicate approximately the same path.

Thus, the display device 100, which is connected to the network N, compares (a) the path information sent from the wireless terminal device 50 which is going to output images to the display device 100 with (b) the preregistered path information at the start of the connection by the image sending application. Therefore, the display device 100 can determine whether or not the wireless terminal device 50 uses the path approximately the same as the path indicated by the preregistered path information and is in the area indicated by the preregistered path information.

Consequently, even when the wireless terminal device 50 has succeeded to send/receive images to/from the display device 100 before, the wireless terminal device 50 cannot be connected (i.e., cannot send images) to the display device 100 if its location at the time of the connection is inappropriate.

Meanwhile, even when its location is, for example, a different floor or a different building than before, as long as the path information is preregistered in response to operations by the network administrator with the cable terminal device 40 present in the same as the wireless terminal device 50, the wireless terminal device 50 can be connected (i.e., can send images) to the display device 100.

Consequently, in the case of displaying images by remote control on the display device 100 connected to the network N, wrong images can be prevented from being displayed thereon.

Further, since there is no system to store image data and resend the data, updates on images can be smoothly sent to the display device 100, which is at a place away from the wireless terminal device 50, without reducing real-time properties.

Further, according to the embodiment, the control unit 111 of the display device 100 compares the received path information with the path information stored in the storage unit 113, and determines that the received path information and the stored path information indicate approximately the same path when finding that the received path information and the stored path information match or are similar to each other.

Consequently, only when these two pieces of the path information match or are similar to each other, the display information can be displayed on the screen unit 120.

That is, the display information can be displayed on the screen unit 120 only from a terminal device (the wireless terminal device 50a in the embodiment) connected to a gateway device (the gateway device 2 in the embodiment) to which a terminal device (the cable terminal device 40a in the embodiment) used for the path information registration process earlier is connected.

Further, according to the embodiment, the control unit 111 of the display device 100 stores in the storage unit 113 path information indicating a network path sent from a predetermined terminal device (the cable terminal device 40a in the embodiment) as the preregistered path information.

Thus, path information can be stored (registered) with a predetermined terminal device (the cable terminal device 40a in the embodiment).

Further, according to the embodiment, when determining that the received path information and the stored path information indicate approximately the same path, the control unit 111 of the display device 100 receives with the communication unit 114 the display information sent from the wireless terminal device 50 which has sent the received path information, and displays the received display information on the screen unit 120.

Consequently, images received from the wireless terminal device 50 which has been determined to use the path approximately the same as the path indicated by the stored path information and be in the area indicated by the stored path information can be displayed on the screen unit 120.

In the above embodiment, the network has one display device 100. Alternatively, the network may be configured in such a way that the gateway device 2 and/or the gateway device 3 are also provided with a display device (s) 100. In this environment where a plurality of display devices 100 are present, images are prevented from being sent to a display device 100 installed in a different area than a terminal device which sends the images.

Other than the terminal device utilizing IEEE802.11, a terminal device connected to the network by an Ethernet cable and a terminal device connected to the network via another wireless communication such as NFC (Near Field Communication), Bluetooth® or optical communication can send images to the display device 100 through a relay connected to the network by the Ethernet cable.

Further, in the embodiment, the cable terminal device 40 (40*a*) is used for the path information registration process. Alternatively, the wireless terminal device 50 may be used for the path information registration process.

Further, in the embodiment, it is determined in the image acceptance/non-acceptance determination process that the above-described two pieces of the path information indicate approximately the same path when the two pieces of the path information match. In addition, it may be determined that the two pieces of the path information indicate approximately the same path when predetermined portions of the two pieces of the path information match.

Further, in the embodiment, by the path information registration process, the path information sent from a predetermined terminal device (the cable terminal device 40*a* in the embodiment) is stored in the storage unit 113. Alternatively, predetermined path information at the network administrator's decision may be stored in the storage unit 113.

Further, in the embodiment, the display information is sent from the wireless terminal device 50. Alternatively, the display information may be pre-stored in the display device 100.

In this case, the display information stored in the display device 100 is correlated with path information, and when it is determined in the image acceptance/non-acceptance determination process that the stored path information and path information sent from the wireless terminal device 50 indicate approximately the same path, the display information correlated, via the stored path information, with the path information sent from the wireless terminal device 50 is read and displayed on the display device 100.

In the above, several embodiments of the present invention are described. However, the scope of the present invention is not limited to the embodiments but includes the scope of claims attached below and equivalences thereof.

What is claimed is:

1. A display device comprising:
   a processor comprising hardware, wherein the processor is configured to:
   compare:
   received path information indicating a first network path from a first terminal device to the display device; and
   preregistered path information indicating a second network path from a second terminal device to the display device,
   to determine whether or not the received path information and the preregistered path information indicate approximately the same path; and
   in response to determining that the received path information and the preregistered path information indicate approximately the same path, display display information on a display,
   wherein the processor is configured to determine that the received path information and the preregistered path information indicate approximately the same path by determining that the first network path and the second network path pass through a same gateway device downstream of one or more access points.

2. The display device according to claim 1,
   wherein the processor is configured to determine that the received path information and the preregistered path information indicate approximately the same path by determining that the first network path and the second network path match each other.

3. The display device according to claim 2,
   wherein the processor is configured to:
   in response to determining that the received path information and the preregistered path information indicate approximately the same path,
   receive the display information from the first terminal device; and
   display the display information on the display.

4. The display device according to claim 1,
   wherein the processor is configured to:
   in response to determining that the received path information and the preregistered path information indicate approximately the same path,
   receive the display information from the first terminal device; and
   display the display information on the display.

5. The display device according to claim 1, further comprising:
   a memory configured to store the preregistered path information.

6. The display device according to claim 1,
   wherein the processor is configured to determine that the received path information and the preregistered path information do not indicate approximately the same path by determining that the first network path and the second network path pass through respectively different gateway devices.

7. The display device according to claim 1,
   wherein the processor is configured to determine that the received path information and the preregistered path information indicate approximately the same path by determining that two predetermined portions of the received path information match two predetermined portions of the preregistered path information.

8. A display method comprising:
   comparing:
   received path information indicating a first network path from a first terminal device to a display device; and
   preregistered path information indicating a second network path from a second terminal device to the display device,
   to determine whether or not the received path information and the preregistered path information indicate approximately the same path; and
   in response to determining that the received path information and the preregistered path information indicate approximately the same path, displaying display information on a display,
   wherein determining that the received path information and the preregistered path information indicate approximately the same path is performed by determining that the first network path and the second network path pass through a same gateway device downstream of one or more access points.

9. A computer-readable storage device storing instructions that, when executed by a processor of a display device, cause the processor to perform:
   comparing:

received path information indicating a first network path from a first terminal device to the display device; and
preregistered path information indicating a second network path from a second terminal device to the display device,
to determine whether or not the received path information and the preregistered path information indicate approximately the same path; and
in response to determining that the received path information and the preregistered path information indicate approximately the same path, displaying display information on a display,
wherein determining that the received path information and the preregistered path information indicate approximately the same path is performed by determining that the first network path and the second network path pass through a same gateway device downstream of one or more access points.

10. The computer-readable storage device storing instructions according to claim 9, wherein the stored instructions, when executed by the processor, cause the processor to perform:
determining that the received path information and the preregistered path information indicate approximately the same path by determining that the first network path and the second network path match each other.

11. The computer-readable storage device storing instructions according to claim 10, wherein the stored instructions, when executed by the processor, cause the processor to perform:
in response to determining that the received path information and the preregistered path information indicate approximately the same path:
receiving the display information from the first terminal device; and
displaying the display information on the display.

12. The computer-readable storage device storing instructions according to claim 9, wherein the stored instructions, when executed by the processor, cause the processor to perform:
in response to determining that the received path information and the preregistered path information indicate approximately the same path:
receiving the display information from the first terminal device; and
displaying the display information on the display.

13. The computer-readable storage device storing instructions according to claim 9, wherein the stored instructions, when executed by the processor, cause the processor to perform:
determining that the received path information and the preregistered path information do not indicate approximately the same path by determining that the first network path and the second network path pass through respectively different gateway devices.

14. The computer-readable storage device storing instructions according to claim 9, wherein the stored instructions, when executed by the processor, cause the processor to perform:
determining that the received path information and the preregistered path information indicate approximately the same path by determining that two predetermined portions of the received path information match two predetermined portions of the preregistered path information.

15. A computer-readable storage device storing instructions that, when executed by a processor of a first terminal device, cause the processor to perform:
sending first data to a display device, the first data containing received path information indicating a first network path from the first terminal device to the display device;
receiving second data from the display device, the second data containing a result of a determination of whether or not the received path information and a preregistered path information indicating a second network path from a second terminal device to the display device, indicate approximately the same path,
wherein a determination that the received path information and the preregistered path information indicate approximately the same path is made based on a determination that the first network path and the second network path pass through a same gateway device downstream of one or more access points; and
in response to receiving the second data containing a result of the determination that the received path information and the preregistered path information indicate approximately the same path, sending third data to the display device, the third data containing information to be displayed by the display device.

16. The computer-readable storage device according to claim 15, wherein the stored instructions, when executed by the processor, further cause the processor to perform:
in response to receiving the second data containing a result of a determination that the received path information and the preregistered path information do not indicate approximately the same path, controlling to not send the third data to the display device.

* * * * *